Nov. 1, 1938.          W. GERRY          2,134,756
CONTROL DEVICE
Filed July 15, 1937
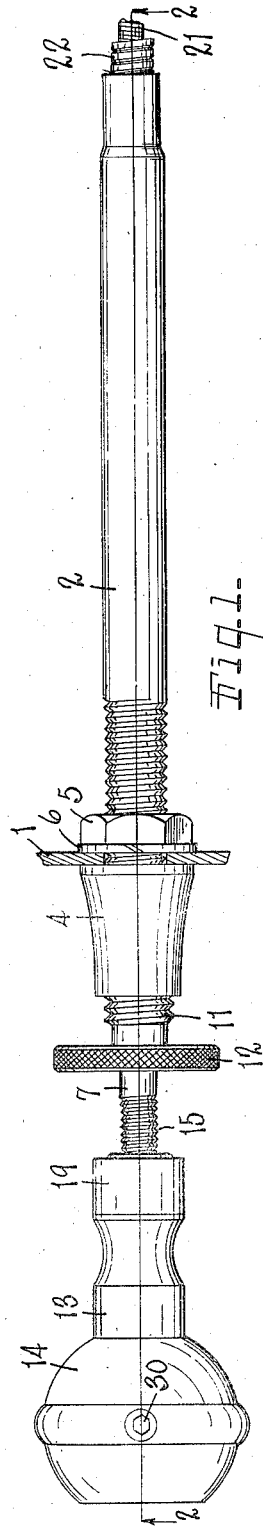
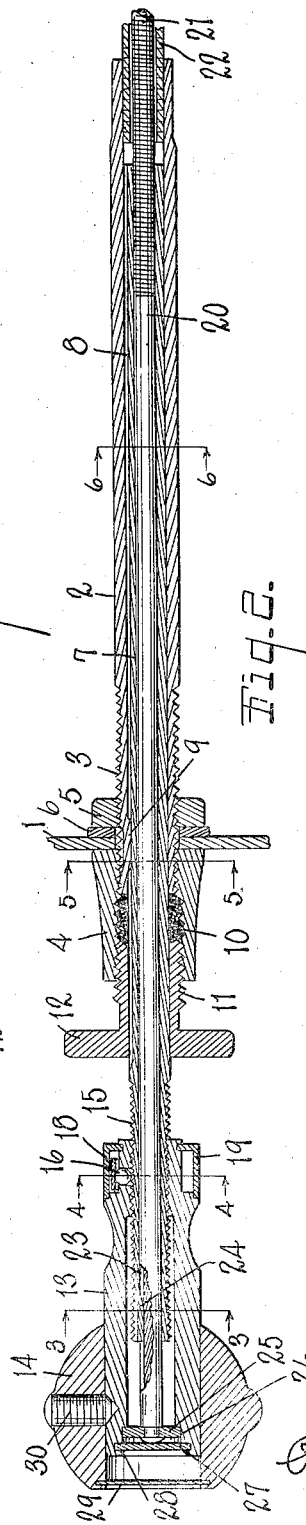
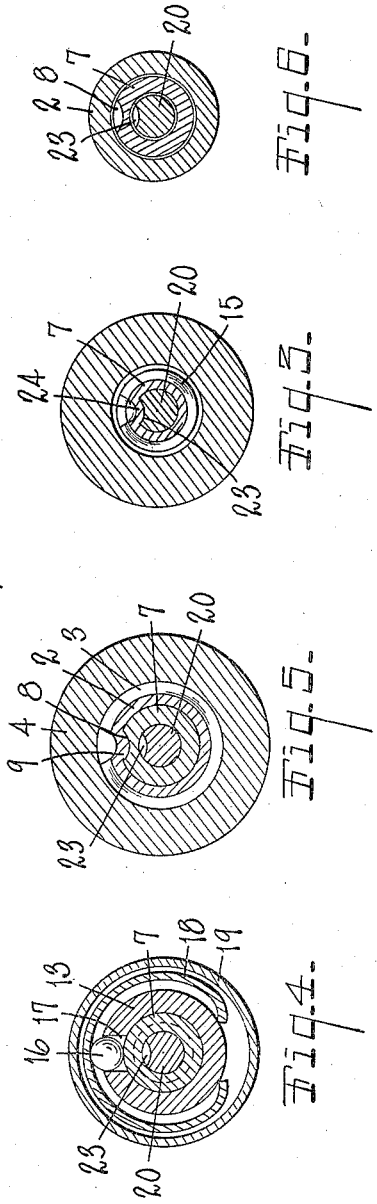
INVENTOR.
William Gerry
BY Chappell, Earl & Chappell
ATTORNEYS Patented Nov. 1, 1938

2,134,756

UNITED STATES PATENT OFFICE 2,134,756

CONTROL DEVICE

William Gerry, Kalamazoo, Mich., assignor to Shakespeare Products Company, Kalamazoo, Mich.

Application July 15, 1937, Serial No. 153,729

14 Claims. (Cl. 74—502)

In remote control devices such for example as throttle controls for internal combustion engines and particularly where it is essential or desirable to synchronize a plurality of engines as in multi-motored planes, much difficulty has been experienced in adjusting or synchronizing and maintaining the adjustment of such engines.

The main objects of this invention are:

First, to provide a remote control device which enables the quick and very accurate adjustment of the part controlled such, for example, as a throttle.

Second, to provide a control device having these advantages which is very easy to manipulate.

Third, to provide a vernier throttle control which effectively maintains its adjustment.

Fourth, to provide a structure having these advantages which is quite simple and economical in structure and not likely to get out of repair.

Objects relating to details and economies of the invention will appear from the description to follow. The invention is defined and pointed out in the claims.

A structure which is a preferred embodiment of the invention is illustrated in the accompanying drawing, in which:

Fig. 1 is a side elevation of a structure embodying the features of my invention, parts being broken away for convenience in illustration.

Fig. 2 is a view mainly in longitudinal section on line 2—2 of Fig. 1.

Fig. 3 is an enlarged cross section on line 3—3 of Fig. 2.

Fig. 4 is an enlarged cross section on line 4—4 of Fig. 2.

Fig. 5 is an enlarged cross section on line 5—5 of Fig. 2.

Fig. 6 is an enlarged cross section on line 6—6 of Fig. 2.

In the accompanying drawing, I have illustrated my improvements as embodied by me in a throttle control which I designate as a vernier throttle control.

Referring to the drawing, 1 represents an instrument board or panel—for example, the instrument board or panel of a flying machine although my improvements are well adapted for automobiles and stationary engines and the like.

The tubular support 2 is externally threaded at 3 to receive the collar 4 engaging one side of the panel 1 and the nut 5 on the opposite side, a washer 6 being arranged between the nut and the panel or instrument board. Within this tubular support is a tubular adjusting member 7 having a longitudinal slide groove 8 receiving the key or feather 9 which prevents rotative movement of the adjusting member while permitting longitudinal movement thereof.

The adjusting member is frictionally held in its adjusted position by means of a suitable friction device, a collar 10 of yieldable material being arranged within the collar or sleeve 4 and pressure being applied thereto by the gland-like member 11 threaded into the member 4 and having a knurled hand piece 12 so that the friction material may be compressed to secure the desired degree of friction.

The head or hand piece 13 is provided with a grip or knob 14 and has threaded engagement with the adjusting member 7 which has a threaded portion 15 of substantial length at its outer end.

To yieldably resist the rotative movement of the head or hand piece 13 I provide a ball detent member 16 seated in a radial bore 17 in the head member to engage the threads of the member 7. A C-shaped spring 18 is arranged within the housing 19 on the inner end of the head membr to urge the ball detent against the threads and this provides suitable friction means so that rattle is eliminated even when there is a loose fit of the threads and also the head is held so that it does not rotate under vibration.

The control rod 20 is reciprocatingly mounted within the adjusting member 7 for longitudinal adjustment therewith or independently thereof. The control rod has a connection 21 designed to be connected to the throttle or other object to be adjusted. This member is arranged within a sheath 22. It is supported against kinking, the sheath being secured at one end to the support and anchored at its other end to a suitably relatively fixed object. Connections of this kind are well understood by those skilled in the art.

The control rod has a longitudinal splined groove 23 engaged by the key or feather 24 so that while it may be adjusted longitudinally within the member 7, its relative rotative movement is prevented.

This control rod has a swivel connection to the head which, in the embodiment illustrated, consists of the disk 25 secured on the end of the control rod and engaging a recess 26 within the head, a retaining disk 27 being secured at the end of the recess by upsetting as indicated at 28. A closure disk 29 is provided at the outer end of the grip 14. The grip is secured by means of the radial set screw 30.

With the parts thus arranged, the object to be controlled is adjusted to approximately the position desired by pulling or pushing on the head piece which moves the adjusting member bodily and also the control rod. For fine adjustments of the control rod, the head piece is rotated and through its threaded engagement with the adjusting member is moved thereby in or out and thereby adjusting the control rod relative to the adjusting member.

So far as applicant is aware, it has been common to attempt to adjust throttles and the like solely by manual manipulation or thrusting the control rod or pulling it out, fine adjustment being secured by a light tapping on the head or hand piece of the control rod. Owing to the fact that considerable friction must be maintained to hold the parts in their adjusted position, it is extremely difficult to manipulate the control rod for fine adjustment by pushing and pulling.

I have by my improvements provided a means which may be very accurately adjusted and the parts remain in their adjusted positions. This is, as stated, highly desirable in multi-motored planes or wherever it is desired to synchronize although it has advantages for use on single motors.

I have illustrated and described my improvements in an embodiment which I consider very practical. I have not attempted to illustrate or describe other embodiments or adaptations as it is believed that this disclosure will enable those skilled in the art to embody or adapt my improvements as may be desired.

Having thus described my invention, what I claim as new and desire to secure by Letters Patent, is:

1. In a control device, the combination of a tubular support, a tubular adjusting member mounted in said support for longitudinal adjustment and supported against rotative movement, means coacting with said adjusting member for frictionally resisting longitudinal movement thereof, a control rod mounted for longitudinal adjustment in and with said adjusting member and supported against rotative movement, a head piece threaded upon the outer end of said adjusting member and having swiveled connection with said control rod whereby said adjusting member and control rod may be adjusted as a unit longitudinally and the control rod may be adjusted longitudinally within said adjusting member by a rotative adjustment of said head piece, and a spring pressed ball detent carried by said head piece and coacting with the threads on said adjusting member.

2. In a control device, the combination of a tubular support, a tubular adjusting member mounted in said support for longitudinal adjustment and supported against rotative movement, means coacting with said adjusting member for frictionally resisting longitudinal movement thereof, a control rod mounted for longitudinal adjustment in and with said adjusting member and supported against rotative movement, a head piece threaded upon the outer end of said adjusting member and having swiveled connection with said control rod whereby said adjusting member and control rod may be adjusted as a unit longitudinally and the control rod may be adjusted longitudinally within said adjusting member by a rotative adjustment of said head piece.

3. In a control device, the combination of a tubular support, a tubular adjusting member mounted in said support for longitudinal adjustment and supported against rotative movement, a control rod mounted for longitudinal adjustment in and with said adjusting member and supported against rotative movement, a head piece threaded upon the outer end of said adjusting member and having swiveled connection with said control rod whereby said adjusting member and control rod may be adjusted as a unit longitudinally and the control rod may be adjusted longitudinally within said adjusting member by a rotative adjustment of said head piece, and a spring pressed ball detent carried by said head piece and coacting with the threads on said adjusting member.

4. In a control device, the combination of a tubular support, a tubular adjusting member mounted in said support for longitudinal adjustment and supported against rotative movement, a control rod mounted for longitudinal adjustment in and with said adjusting member and supported against rotative movement, and a head piece threaded upon the outer end of said adjusting member and having swiveled connection with said control rod whereby said control rod may be adjusted longitudinally within said adjusting member by a rotative adjustment of said head piece.

5. In a control device, the combination of a tubular support, a tubular adjusting member mounted in said support for longitudinal adjustment, means coacting with said adjusting member for frictionally resisting longitudinal movement thereof, a control rod mounted for longitudinal adjustment in and with said adjusting member, a hand piece having threaded connection with said adjusting member and having rotatable connection with said control rod whereby said adjusting member and control rod may be adjusted as a unit longitudinally and the control rod may be adjusted longitudinally of said adjusting member by a rotative adjustment of said hand piece, and a pressure means carried by said hand piece and coacting with the threads on said adjusting member.

6. In a control device, the combination of a tubular support, a tubular adjusting member mounted in said support for longitudinal adjustment, means coacting with said adjusting member for frictionally resisting longitudinal movement thereof, a control rod mounted for longitudinal adjustment in and with said adjusting member, and a hand piece having threaded connection with said adjusting member and having rotatable connection with said control rod whereby said adjusting member and control rod may be adjusted as a unit longitudinally and the control rod may be adjusted longitudinally of said adjusting member by a rotative adjustment of said hand piece.

7. In a control device, the combination of a tubular support, a tubular adjusting member mounted in said support for longitudinal adjustment, a control rod mounted for longitudinal adjustment in and with said adjusting member, a hand piece having threaded connection with said adjusting member and having rotatable connection with said control rod whereby said adjusting member and control rod may be adjusted as a unit longitudinally and the control rod may be adjusted longitudinally of said adjusting member by a rotative adjustment of said hand piece, and a pressure means carried by said hand piece and coacting with the threads on said adjusting member.

8. In a control device, the combination of a tubular support, a tubular adjusting member mounted in said support for longitudinal adjustment, a control rod mounted for longitudinal adjustment in and with said adjusting member, and a hand piece having threaded connection with said adjusting member and having rotatable connection with said control rod whereby said adjusting member and control rod may be adjusted as a unit longitudinally and the control rod may be adjusted longitudinally of said adjusting member by a rotative adjustment of said hand piece.

9. In a control device, the combination of a support, an adjusting member mounted for longitudinal adjustment on said support, means for frictionally resisting the longitudinal movement of said adjusting member, a control rod associated with said adjusting member for longitudinal adjustment with relation thereto, a hand piece having threaded connection with said adjusting member and a rotatable connection with said control rod whereby said adjusting member and control rod may be adjusted longitudinally as a unit and the control rod may be adjusted relative to said adjusting member, and means acting to yieldably hold said hand piece in its adjusted positions relative to said adjusting member.

10. In a control device, the combination of a support, an adjusting member mounted for longitudinal adjustment on said support, means for frictionally resisting the longitudinal movement of said adjusting member, a control rod associated with said adjusting member for longitudinal adjustment with relation thereto, and a hand piece having threaded connection with said adjusting member and a rotatable connection with said control rod whereby said adjusting member and control rod may be adjusted longitudinally as a unit and the control rod may be adjusted relative to said adjusting member.

11. In a control device, the combination of a support, an adjusting member mounted for longitudinal adjustment on said support, a control rod associated with said adjusting member for longitudinal adjustment with relation thereto, a hand piece having threaded connection with said adjusting member and a rotatable connection with said control rod whereby said adjusting member and control rod may be adjusted longitudinally as a unit and the control rod may be adjusted relative to said adjusting member, and means acting to yieldably hold said hand piece in its adjusted positions relative to said adjusting member.

12. In a control device, the combination of a support, an adjusting member mounted for longitudinal adjustment on said support, a control rod associated with said adjusting member for longitudinal adjustment with relation thereto, and a hand piece having threaded connection with said adjusting member and a rotatable connection with said control rod whereby said adjusting member and control rod may be adjusted longitudinally as a unit and the control rod may be adjusted relative to said adjusting member.

13. In a control device, the combination of a support, a pair of adjusting members carried by said support and operatively associated for longitudinal adjustment as a unit or for longitudinal adjustment relative to each other, and a hand piece having threaded connection with one of said members and shiftable axially thereof by rotation of the hand piece, said hand piece having a rotatable connection with the other of said members for longitudinally adjusting one member relative to the other, said other of said members being provided with means for connecting it to the object to be adjusted, said support being provided with friction means for yieldably holding said one of said members in its longitudinally adjusted positions.

14. In a control device, the combination of a support, a pair of adjusting members carried by said support and operatively associated for longitudinal adjustment relative to each other, and a hand piece having threaded connection with one of said members and shiftable axially thereof by rotation of the hand piece, said hand piece having a rotatable connection with the other of said members for longitudinally adjusting one member relative to the other, said other of said members being provided with means for connecting it to the object to be adjusted.

WILLIAM GERRY.